(12) United States Patent
Lin et al.

(10) Patent No.: US 9,515,320 B2
(45) Date of Patent: Dec. 6, 2016

(54) CATHODE MATERIAL WITH OXYGEN VACANCY AND MANUFACTURING PROCESS THEREOF

(71) Applicant: Advanced Lithium Electrochemistry Co., Ltd., Taoyuan, Taoyuan County (TW)

(72) Inventors: Hsiang-Pin Lin, Taoyuan (TW); Han-Wei Hsieh, Taoyuan (TW); Yuan-Kai Lin, Taoyuan (TW); Ming-Hui Lai, Taoyuan (TW)

(73) Assignee: ADVANCED LITHIUM ELECTROCHEMISTRY CO., LTD., Toayuan (TW)

( * ) Notice: Subject to any disclaimer, the term of this patent is extended or adjusted under 35 U.S.C. 154(b) by 61 days.

(21) Appl. No.: 14/367,112

(22) PCT Filed: Dec. 21, 2012

(86) PCT No.: PCT/CN2012/087171
§ 371 (c)(1),
(2) Date: Jun. 19, 2014

(87) PCT Pub. No.: WO2013/091573
PCT Pub. Date: Jun. 27, 2013

(65) Prior Publication Data
US 2015/0021517 A1    Jan. 22, 2015

Related U.S. Application Data

(60) Provisional application No. 61/578,329, filed on Dec. 21, 2011.

(51) Int. Cl.
H01M 4/88 (2006.01)
H01M 4/58 (2010.01)
C01B 25/45 (2006.01)

(52) U.S. Cl.
CPC ............ H01M 4/5825 (2013.01); C01B 25/45 (2013.01); *C01P 2002/72* (2013.01); *C01P 2004/03* (2013.01); *C01P 2004/51* (2013.01);
(Continued)

(58) Field of Classification Search
CPC .......... H01M 4/36; H01M 4/38; H01M 4/58; C01B 25/10; C01B 25/26; C01B 25/45
USPC ............... 252/182.1; 423/301, 306; 429/221, 429/231.9
See application file for complete search history.

(56) References Cited

U.S. PATENT DOCUMENTS

2003/0190526 A1* 10/2003 Saidi ................. C01B 25/45
429/231.9
2007/0166617 A1   7/2007 Gozdz et al.
(Continued)

FOREIGN PATENT DOCUMENTS

CA    2750328    7/2010
CN    1691380    11/2005
(Continued)

*Primary Examiner* — Khanh Tuan Nguyen
(74) *Attorney, Agent, or Firm* — Kirton McConkie; Evan R. Witt

(57) ABSTRACT

A cathode material with oxygen vacancy is provided. The cathode material includes a lithium metal phosphate compound having a general formula $LiMPO_{4-z}$, wherein M represents at least one of a first-row transition metal, and $0.001 \leq z \leq 0.05$.

9 Claims, 4 Drawing Sheets

(52) U.S. Cl.
CPC ........ *C01P2004/62* (2013.01); *C01P 2006/10* (2013.01); *C01P 2006/12* (2013.01); *C01P 2006/40* (2013.01)

(56) References Cited

U.S. PATENT DOCUMENTS

2008/0241043 A1* 10/2008 Barker .................. C01B 25/455
423/301

2010/0183924 A1* 7/2010 Song ....................... C01B 25/45
429/221

FOREIGN PATENT DOCUMENTS

| CN | 1797823 | 7/2006 |
|----|---------|--------|
| CN | 1876565 | 12/2006 |
| CN | 101332987 | 12/2008 |
| WO | 2006/066470 | 6/2006 |
| WO | 2010/106035 | 9/2010 |

* cited by examiner

CATHODE MATERIAL WITH OXYGEN VACANCY AND MANUFACTURING PROCESS THEREOF

FIELD OF THE INVENTION

The present invention relates to a cathode material, and more particularly to a cathode material with oxygen vacancy.

BACKGROUND OF THE INVENTION

With the diversified development of electronic products, the demands on portable energy sources are gradually increased. For example, consumer electronic devices, medical instruments, electric bicycles, electric vehicles or electric hand tools use portable power sources as sources of electric power. Among these portable power sources, rechargeable batteries (also referred as secondary cells) are widely used because the electrochemical reactions thereof are electrically reversible. Moreover, among the conventional secondary cells, lithium-ion secondary cells have high volumetric capacitance, low pollution, good charge and discharge cycle characteristics, and no memory effect. Consequently, the lithium-ion secondary cells are more potential for development.

As known, the performance of the secondary cell is influenced by many factors. Generally, the material for producing a positive electrode (also referred as a cathode) is more critical to the performance of the secondary cell. Because of good electrochemical characteristics, low environmental pollution, better security, abundant raw material sources, high specific capacity, good cycle performance, good thermal stability and high charge/discharge efficiency, the lithium iron phosphate-based compound having an olivine structure or a NASICON structure is considered to be the potential lithium-ion battery cathode material.

However, due to the hindrance of the crystalline structure, the lithium iron phosphate compound has very low electronic conductivity and low lithium diffusion rate. Consequently, the applications of the lithium iron phosphate compound are restricted. Therefore, it is an important issue to enhance the electrical performance of the lithium iron phosphate compound.

SUMMARY OF THE INVENTION

The present invention provides a cathode material with oxygen vacancy. During the process of preparing the lithium metal phosphate compound, a portion of the phosphate is substituted by an anionic group with three (or less) oxygen atoms. Consequently, a lithium metal phosphate compound with oxygen vacancy is produced. Moreover, the conductive performance of the cathode material is enhanced, and the electric capacity of the cathode material is increased.

In accordance with an aspect of the present invention, there is provided a cathode material with oxygen vacancy. The cathode material includes a lithium metal phosphate compound having a general formula $LiMPO_{4-z}$, wherein M represents at least one of a first-row transition metal, and $0.001 \leq z \leq 0.05$.

In accordance with another aspect of the present invention, there is provided a process of manufacturing a cathode material with oxygen vacancy. Firstly, a lithium metal phosphate raw material is provided. The lithium metal phosphate raw material is a mixture of a lithium-containing first material, a metal-containing second material and a phosphate-containing third material, wherein 0.1~5 mol % of phosphate in the third material is substituted by an anionic group $[XO_3^{n-}]$. Then, the first material, the second material and the third material carry out a dry processing reaction or a wet processing reaction. Afterwards, the first material, the second material and the third material are thermally treated by sintering. Consequently, a lithium metal phosphate compound with oxygen vacancy is produced.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
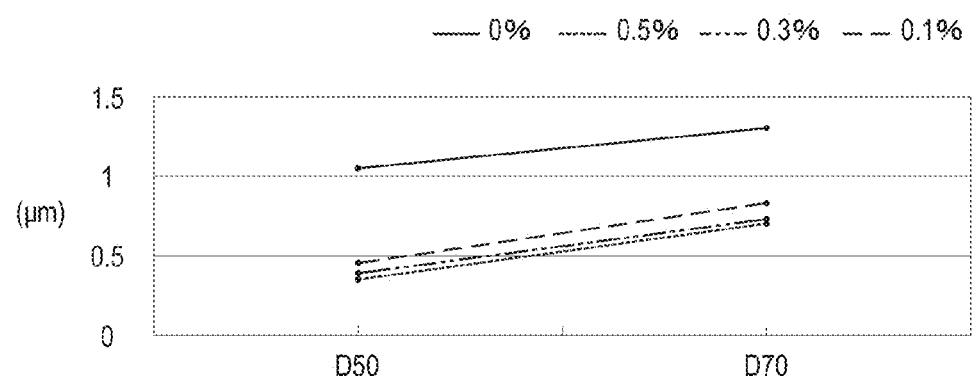
FIG. 1 shows the secondary particle diameter change of the slurry with different phosphite substitution ratios.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a cathode material. First of all, an organic polymeric chelating agent is provided. The chelating end of organic polymeric chelating agent has an anionic group $[XO_3^{n-}]$, wherein X=P, S, N, and $1 \leq n \leq 3$. By carrying out a dispersion process and adjusting the molar ratio of $[XO_3^{n-}]/PO_4^{3-}$, a lithium metal phosphate compound with oxygen vacancy is produced. The the lithium iron phosphate compound has a general formula $LiMPO_{4-z}$.

In particular, the anionic group $[XO_3^{n-}]$ only contains three oxygen atoms. During the synthesis process of the lithium metal phosphate compound, a portion of the phosphate with four oxygen atoms is substituted by the anionic group $[XO_3^{n-}]$. Consequently, the produced lithium metal phosphate compound has oxygen vacancy. Since this type of lithium metal phosphate compound has oxygen vacancy, the spatial structure of the unit cell is changed. Under this circumstance, the lithium diffusion rate is increased, the conductive performance of the cathode material is enhanced, and the electric capacity of the cathode material is increased.

The present invention further provides a process of manufacturing a cathode material with oxygen vacancy. Firstly, a lithium metal phosphate raw material is provided. The lithium metal phosphate raw material is a mixture of a lithium-containing first material, a metal-containing second material and a phosphate-containing third material. In the third material, 0.1~5 mol % of phosphate is substituted by the anionic group $[XO_3^{n-}]$. After the first material, the second material and the third material are subject to a dry processing reaction or a wet processing reaction, the mixture is thermally treated by sintering. Consequently, lithium metal phosphate compound with oxygen vacancy is produced. The lithium metal phosphate compound has a general formula LiMPO$_{4-z}$. In the general formula, M represents at least one of a first-row transition metal selected from iron (Fe), manganese (Mn), cobalt (Co), nickel (Ni), titanium or chromium (Cr), 0.001≤z≤0.05, X=P, S, N, and 1≤n≤3. For example, the anionic group [XO$_3^{n-}$] represents PO$_3^{3-}$, SO$_3^{2-}$ or NO$_3^{-}$.

In an embodiment, the first material includes but is not limited to lithium hydroxide or lithium carbonate; the second material includes but is not limited to iron powder, ferric oxalate or ferrous chloride; and the third material contains a phosphate source (e.g. phosphoric acid) and a phosphite organic compound for substituting the phosphate (e.g. phosphite ester or organophosphite). An example of the phosphite organic compound includes but is not limited to isopropyl-idene-diphenol-phosphite ester resin.

Alternatively, in another embodiment, the third material contains a phosphate source (e.g. phosphoric acid) and a hydrophosphite organic compound for substituting the phosphate (e.g. tert-butyl glycinate hydrophosphite, distearyl hydrophosphite or diethyl hydrophosphite).

Optionally, during the process of manufacturing the cathode material, a fourth material such as a metal oxide may be added to the raw material. For example, the metal oxide includes but is not limited to MgO, TiO$_2$ or V$_2$O$_5$.

The preparation process and efficacy of the cathode material with oxygen vacancy will be illustrated in the following examples.

EXAMPLE 1

Iron powder (2740 g) was added to phosphoric acid solution (5734 g, 85%~85.5%, Mw: 97.97), and a reaction of the mixture was carried out for 24 hours. After the reaction was completed, a phosphite organic compound, isopropyl-idene-diphenol-phosphite ester resin (600 g, Mw: 2400), was added to the reaction product. In addition, fructose (625 g) and V$_2$O$_5$ (<1wt %) were added, and the mixture was ground and dispersed (grinding speed: 550 rpm~650 rpm, zirconia ball: 0.5 mm~1.0 mm). Then, a lithium source (e.g. LiOH, Li/P molar ratio: 0.990~1.005) was added to form an aqueous solution (solid content: 25%~45%). Then, the aqueous solution was spray-dried (hot-air temperature: 200~220° C., outlet temperature: 85~95° C.) to form a powdery mixture. Under a protective atmosphere such as nitrogen or argon gas, the powdery mixture was sintered (<650° C., crucible capacity: 60%~80%). After the sintering process was completed, a product powder was obtained.

The proportion of phosphite for substituting phosphate was in the range between 1 and 5 mol %. Since the phosphate content was about 49.75 moles, the phosphite content was about 0.25 mole. That is, 0.5% of phosphate was substituted by phosphite. The product powder is a lithium iron phosphate compound having a general formula LiMPO$_{4-z}$, wherein z is the substitution ratio (0.005). The oxygen number is 3.995 (i.e. 4×(1−0.005)+3×0.005=4−0.005=3.995). In other words, the chemical formula of the lithium iron phosphate compound is LiFePO$_{3.995}$.

EXAMPLES 2~6

Except for the amount of the phosphoric acid and the phosphite organic compound, the manufacturing processes of Examples 2~6 were substantially identical to the manufacturing process of Example 1. Consequently, various products with different phosphite substitution ratios were prepared. In Examples 2~6, the phosphite substitution ratios are 0.1%, 0.3%, 0.75%, 2% and 5%, respectively.

EXAMPLE 7

Except that the phosphite organic compound was replaced by a hydrophosphite organic compound, the manufacturing process of Example 7 was substantially identical to the manufacturing process of Example 1. For example, the hydrophosphite organic compound includes but is not limited to tert-butyl glycinate hydrophosphite, distearyl hydrophosphite or diethyl hydrophosphite.

EXAMPLE 8

In comparison with the wet process of Example 1, this embodiment used a dry process to prepare the lithium iron phosphate compound with oxygen vacancy. A solid mixture of lithium carbonate, ferric oxalate and ammonium hydrogen phosphate at a molar ratio 0.995~1.005:0.985~0.995:1 was prepared. Then, the mixture was sintered at the temperature 325° C±25° C. The sintering process has a dehydrating function and a carbonate removal function. After the sintering process was completed, a phosphite organic compound (e.g. phosphite ester or organophosphite) was added to the precursor. The proportion of phosphite for substituting phosphate was in the range between 1 and 5 mol %. Then, a small amount of organic solution was added to prepare slurry with a solid content >80%. Under a protective atmosphere such as nitrogen or argon gas, the powdery mixture was sintered (<700° C.). After the sintering process was completed, a product powder was obtained.

EXAMPLE 9

The following table 1 shows the secondary particle diameter change of the slurry with different phosphite substitution ratios. From the D$_{50}$ and D$_{70}$ values, the slurry with phosphite to substitute phosphate has much smaller second particle diameter (μm) than the slurry without phosphite substitution. The result shows that the addition of the phosphite organic compound is effective to increase the grinding efficiency. Consequently, the particle dispersion efficacy is enhanced, the aggregation in the sintering process is reduced, and the particle size of the product powder is smaller.

TABLE 1

|  | D$_{50}$ | D$_{70}$ |
|---|---|---|
| No substitution | 1.05 | 1.3028 |
| 0.5% substitution | 0.35 | 0.7025 |
| 0.3% substitution | 0.39 | 0.7305 |
| 0.1% substitution | 0.45 | 0.8104 |

The data about the particle diameter listed in Table 1 may be plotted as FIG. 1. According to the positive linear relationship, the addition of the phosphite organic compound is effective to increase the grinding efficiency.

Although the particle diameter of the slurry is effectively reduced, the addition of the lithium source (e.g. LiOH) increases the reaction rate and thus the slurry suddenly becomes sticky. For solving this drawback, the following measures may be adopted: (A) the grinding speed is decreased and the grinding efficiency in unit time is decreased, (B) the pH range while adding LiOH is properly controlled, (C) the temperature while adding LiOH is effectively controlled, and (D), the particle diameter of the white slurry before LiOH addition is properly controlled and the operating range is defined.

EXAMPLE 10

The following table 2 shows the secondary particle diameter change of the slurry with a 0.5% phosphite substitution ratio. In Table 2, S0 represents the product powder with no phosphite substitution, and S1 and S2 represent two product powder samples with 0.5% phosphite substitution ratio. From the $D_{50}$ and $D_{95}$ values, the product powder with phosphite to substitute phosphate has much smaller second particle diameter (μm) than the product powder without phosphite substitution.

TABLE 2

|    | $D_{50}$ | $D_{95}$ |
|----|------|-------|
| S0 | 28.4 | 57.68 |
| S1 | 15.69 | 47.46 |
| S2 | 13.91 | 45.93 |

Figure 2:
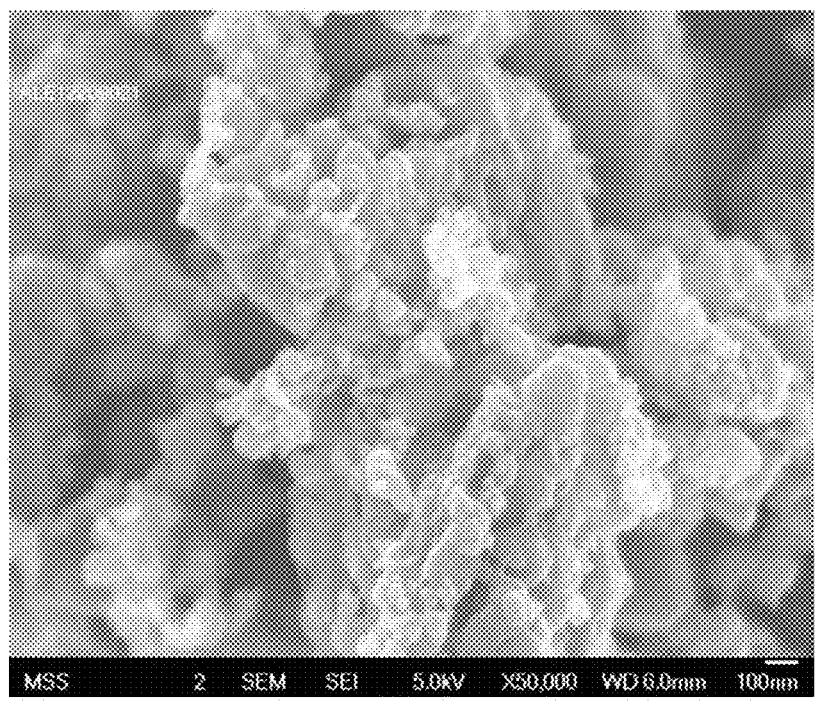
FIG. 2 schematically illustrates the SEM photograph of the product powder with 0.5% phosphite substitution ratio.

The SEM photograph of the S2 product powder is shown in FIG. 2. From the SEM photograph, the primary particle diameter is also reduced. It is presumed that the oxygen vacancy may result in lattice defects. Consequently, after phase formation, the growth of the crystal particle will be inhibited. Under this circumstance, the primary particle diameter is smaller, the C rate is better, and the low temperature performance is enhanced.

EXAMPLE 11

The physical data of some product powder samples with 0.5% phosphite substitution ratio are shown in Table 3 as follows. In Table 3, S3~S9 represent different product powder samples (50 moles for verification). It is found that the surface areas of the product powder samples are effectively increased. That is, the product powder samples have more pores, and the primary particle diameters are smaller.

TABLE 3

| Sample | Density | $D_{10}$ | $D_{50}$ | $D_{95}$ | Surface Area | ICP Li | Fe | P | STD | | |
|--------|---------|------|------|------|--------------|-------|-------|---|-------|-------|---|
| S3 | 0.55 | 2.56 | 10.35 | 24.93 | 15.23 | 1.056 | 0.955 | 1 | 0.999 | 0.987 | 1 |
| S4 | 0.65 | 2.68 | 24.05 | 46.27 | 18.70 | 0.988 | 0.982 | 1 | 0.983 | 0.982 | 1 |
| S5 | 0.56 | 2.71 | 15.75 | 43.7 | 20.52 | 0.994 | 0.974 | 1 | 1.003 | 0.981 | 1 |
| S6 | 0.76 | 2.60 | 20.75 | 48.56 | 18.25 | 1.001 | 0.972 | 1 | 1.003 | 0.981 | 1 |
| S7 | 0.62 | 3.20 | 14.43 | 44.25 | 17.26 | 1.023 | 0.965 | 1 | 0.995 | 0.972 | 1 |
| S8 | 0.85 | 1.36 | 18.14 | 52.08 | 17.31 | 0.977 | 0.961 | 1 | 0.973 | 0.962 | 1 |
| S9 | 0.851 | 1.77 | 16.72 | 46.16 | 18.05 | 0.953 | 0.946 | 1 | 0.952 | 0.946 | 1 |

EXAMPLE 12

The electrical data of some product powder samples with 0.5% phosphite substitution ratio are shown in Table 4 and Table 5 as follows. In Table 3, S2~S9 represent different product powder samples (small quantity of 2 moles for verification in Table 4 and large quantity of 50 moles for verification in Table 5). From these two tables, it is found that the electric capacity values of the product powder samples at a discharge rate of 2C are all larger than or close to 140 mAh/g. Moreover, the behaviors of the product powder sample S9 at higher charge/discharge rates are also observed. The electric capacity value of the product powder sample S9 at a discharge rate of 2C is larger than 140 mAh/g.

TABLE 4

| | Capacity | | | | | | | |
|---|---|---|---|---|---|---|---|---|
| Sample | 0.1C-C | 0.1C-D | 0.1C-C | 0.1C-D | 1C-C | 2C-D | 1C-C | 2C-D |
| S2 | 163.99 | 157.69 | 157.75 | 156.97 | 157.46 | 140.35 | 140.91 | 139.65 |

TABLE 5

| | Capacity | | | | | | | |
|---|---|---|---|---|---|---|---|---|
| Sample | 0.1C-C | 0.1C-D | 0.1C-C | 0.1C-D | 1C-C | 2C-D | 1C-C | 2C-D |
| S3 | 166.63 | 155.68 | 158.39 | 156.17 | 157.00 | 142.42 | 142.28 | 142.23 |
| S4 | 171.83 | 154.69 | 170.56 | 153.51 | 157.75 | 137.76 | 135.93 | 137.07 |
| S5 | 162.93 | 155.63 | 156.94 | 155.28 | 156.57 | 137.65 | 138.82 | 137.56 |
| S6 | 162.90 | 157.55 | 158.16 | 157.96 | 155.92 | 140.87 | 137.82 | 140.73 |

TABLE 5-continued

| | | | | | | | | |
|---|---|---|---|---|---|---|---|---|
| S7 | 164.86 | 158.66 | 159.86 | 159.63 | 157.80 | 146.46 | 143.11 | 145.92 |
| S8 | 175.09 | 154.72 | 162.16 | 157.37 | 161.36 | 136.55 | 136.38 | 137.41 |
| | 0.1C-C | 0.1C-D | 0.2C-C | 0.5C-D | 2C-C | 2C-D | 2C-C | 2C-D |
| S9 | 165.77 | 152.60 | 157.38 | 152.28 | 151.36 | 145.87 | 146.25 | 146.33 |

From the above experiments, it is found that the oxygen vacancy may result in the spatial structure change of the unit cell. Under this circumstance, the lithium diffusion rate is increased, the conductive performance of the cathode material is enhanced, and the electric capacity of the cathode material is increased.

EXAMPLE 13

Figure 3:
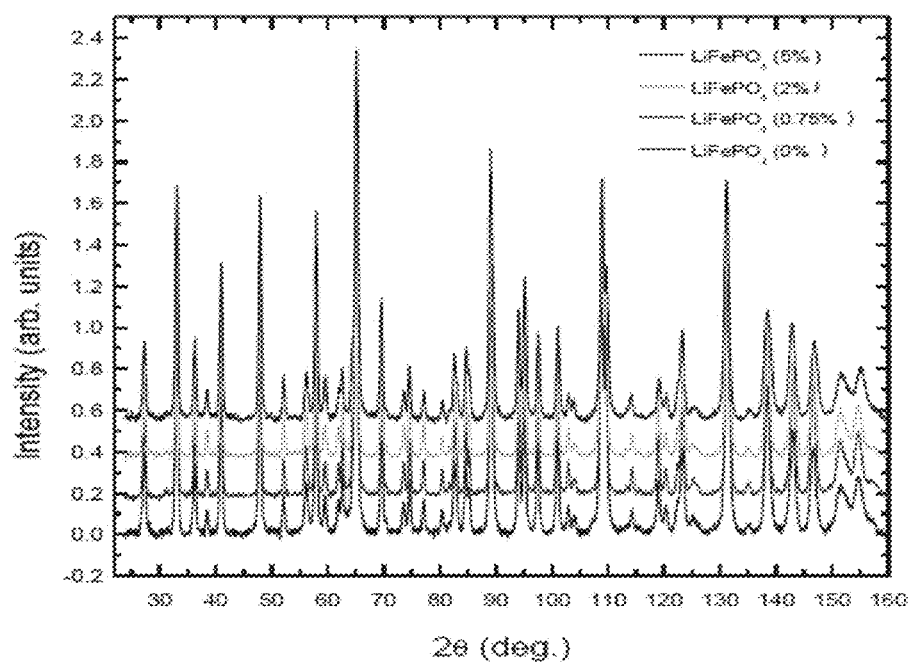
FIG. 3 schematically illustrates the NPD patterns of some product powder samples with different phosphite substitution ratios.
Figure 4:
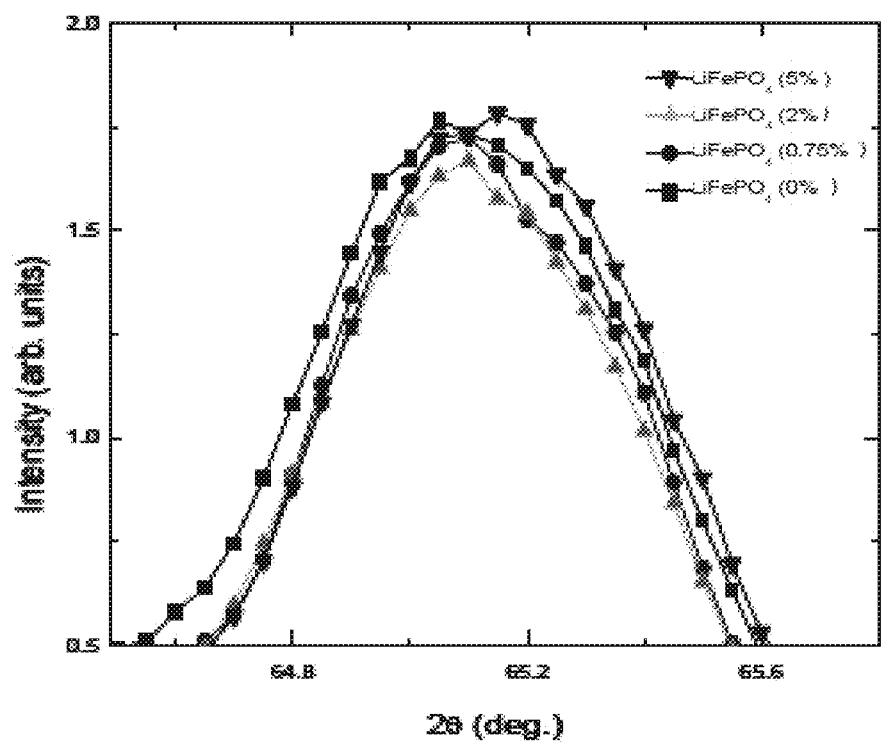
FIG. 4 schematically illustrates a diffraction peak pattern contributed by O atoms.

The neutron powder diffraction (NPD) patterns of some product powder samples with different phosphite substitution ratios are shown in FIGS. 3 and 4. Since X-ray is not suitable to observe Li but neutron is more sensitive to light element than X-ray, the neutron powder diffraction pattern may be used to observe the presence of Li atom. Moreover, due to the difference between the O-scattering cross sections, the diffraction peak change can be obviously observed.

FIG. 3 schematically illustrates the NPD patterns of some product powder samples with different phosphite substitution ratios. From the NPD patterns, the phase of LiFePO$_4$ is measured. Sine P is only bonded to O, none of the elements of LiFePO$_4$ can be substituted. In other words, the charge balance problem and the energy balance problem are no longer generated. The bonding between P, Fe and O plays an important role in providing more channels for allowing free access of lithium ion. Moreover, due to the ordered lattice arrangement, the structure is more stable. Consequently, the lithium ion can move in or move out more smoothly.

FIG. 4 schematically illustrates a diffraction peak pattern contributed by O atoms. As the phosphite substitution ratio increases from 0% to 2%, the NPD patterns show that the lattice arrangement is better and the oxygen vacancy is increased. Although the oxygen vacancy is increased by about 1.3%, more lithium ions can move out the crystalline structure. Since the oxygen vacancy is a main path of moving in/out the lithium ion, the possibility of generating the dead lithium ion is largely reduced. This is the main reason why the electric capacity is increased. However, if the phosphite substitution ratio is 5%, the crystal lattice distortion becomes more serious. Under this circumstance, the electric capacity is impaired.

From the above descriptions, the present invention provides a cathode material with oxygen vacancy. The cathode material comprises a lithium metal phosphate compound having a general formula LiMPO$_{4-z}$, wherein M represents at least one of a first-row transition metal, and 0.001≤z≤0.05. During the process of preparing the lithium metal phosphate compound, a portion of the phosphate is substituted by an anionic group with three (or less) oxygen atoms. Consequently, a lithium metal phosphate compound with oxygen vacancy is produced. Since this type of lithium metal phosphate compound has oxygen vacancy, the spatial structure of the unit cell is changed. Under this circumstance, the lithium diffusion rate is increased, the conductive performance of the cathode material is enhanced, and the electric capacity of the cathode material is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process of manufacturing a cathode material with oxygen vacancy, the process comprising steps of:
   providing a lithium metal phosphate raw material, wherein the lithium metal phosphate raw material is a mixture of a lithium-containing first material, a metal-containing second material and a phosphate-containing third material, wherein 0.1~5 mol % of phosphate in the third material is substituted by an anionic group [XO$_3{}^{n-}$], wherein the anionic group [XO$_3{}^{n-}$] represents PO$_3{}^{3-}$, SO$_3{}^{2-}$ or NO$_3{}^{-}$;
   allowing the first material, the second material and the third material to carry out a dry processing reaction or a wet processing reaction; and
   thermally treating the first material, the second material and the third material by sintering, so that a lithium metal phosphate compound with oxygen vacancy is produced.

2. The process according to claim 1, wherein the first material is lithium hydroxide or lithium carbonate.

3. The process according to claim 1, wherein the second material is iron powder, ferric oxalate or ferrous chloride.

4. The process according to claim 1, wherein the third material contains phosphoric acid as a phosphate source and a phosphite organic compound for substituting the phosphate.

5. The process according to claim 4, wherein the phosphite organic compound is phosphite ester or organophosphate.

6. The process according to claim 4, wherein the phosphite organic compound is isopropyl-idene-diphenol-phosphite ester resin.

7. The process according to claim 1, wherein the third material contains phosphoric acid as a phosphate source and a hydrophosphite organic compound for substituting the phosphate.

8. The process according to claim 7, wherein the hydrophosphite organic compound is tert-butyl glycinate hydrophosphite, distearyl hydrophosphite or diethyl hydrophosphite.

9. The process according to claim 1, wherein the lithium metal phosphate compound with oxygen vacancy has a general formula LiM(PO$_4$)$_{1-z}$(XO$_3$)$_z$, wherein M represents at least one of a first-row transition metal, and 0.001≤z≤0.05.

* * * * *